July 14, 1953   D. G. ROOS   2,645,305
MEANS FOR LUBRICATING BEARINGS
Filed May 22, 1951   4 Sheets-Sheet 1
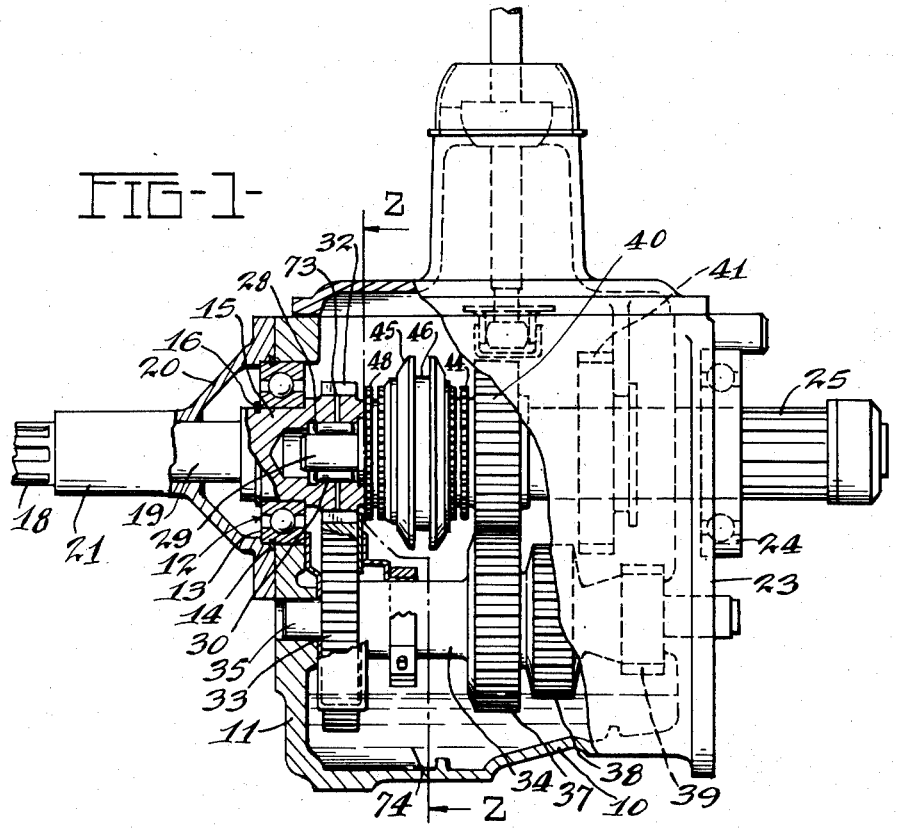
FIG-1-
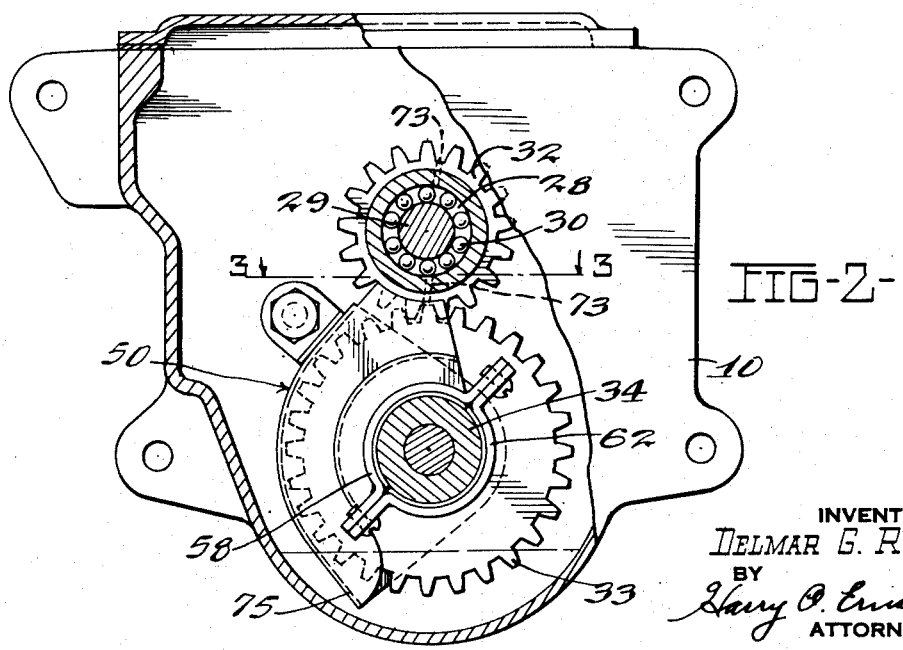
FIG-2-
INVENTOR:
DELMAR G. ROOS.
BY
Harry O. Ernsberger
ATTORNEY July 14, 1953  D. G. ROOS  2,645,305
MEANS FOR LUBRICATING BEARINGS
Filed May 22, 1951  4 Sheets-Sheet 2
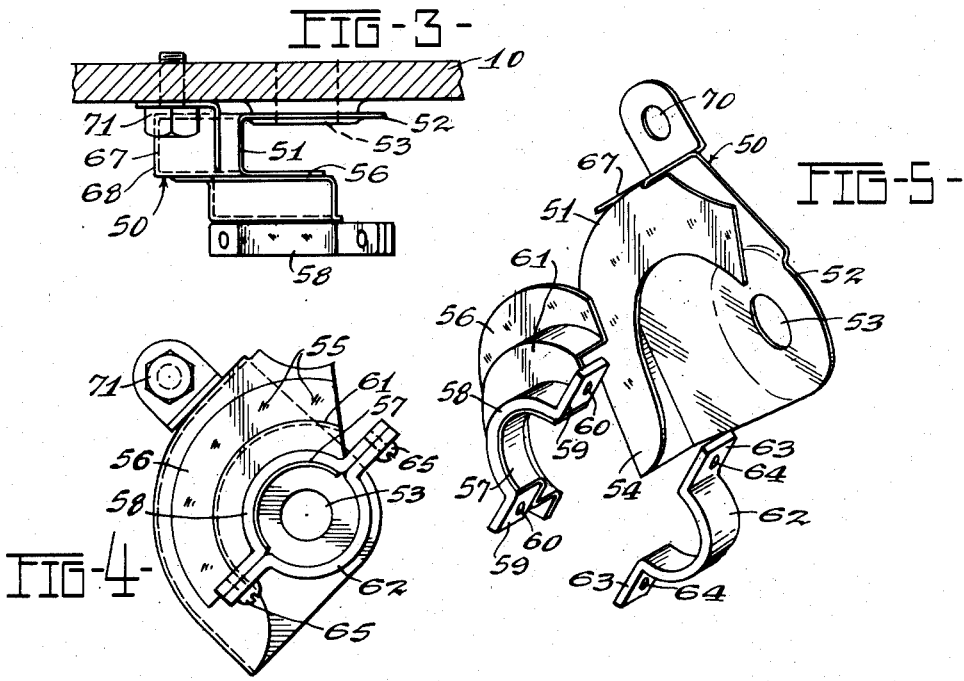
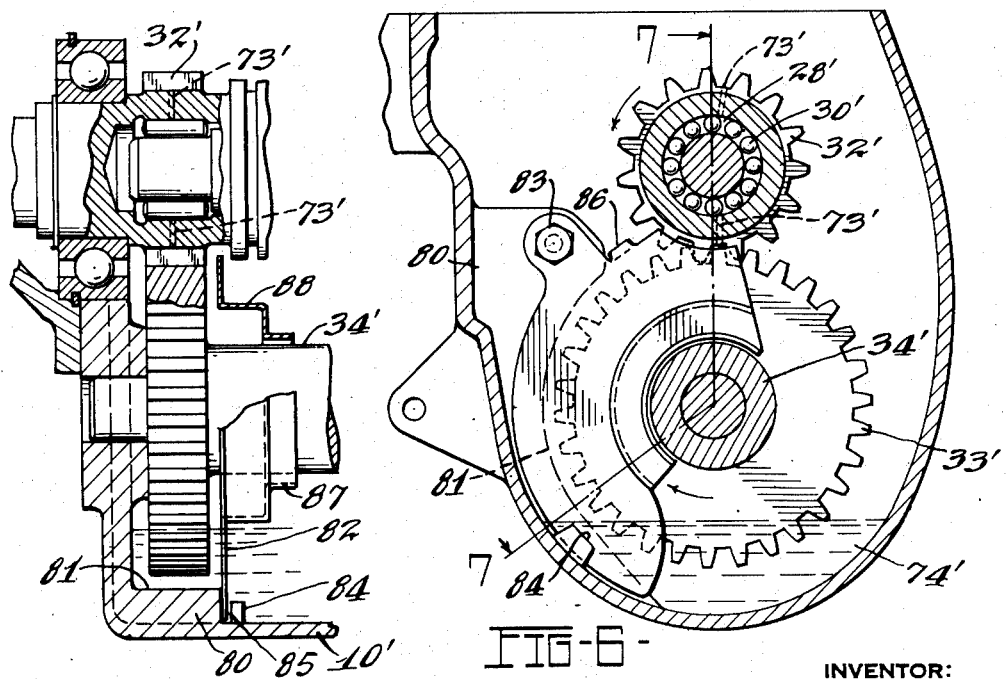
INVENTOR:
DELMAR G. ROOS.
BY
Harry O. Ernsberger
ATTORNEY July 14, 1953 — D. G. ROOS — 2,645,305
MEANS FOR LUBRICATING BEARINGS
Filed May 22, 1951 — 4 Sheets-Sheet 3
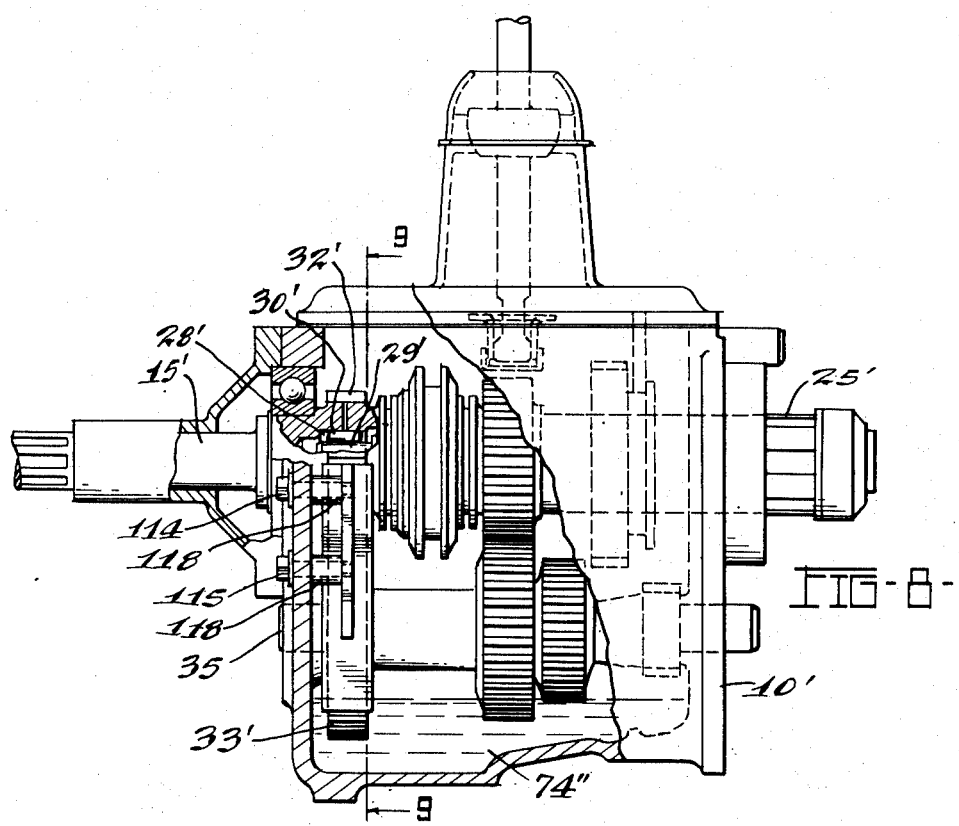
FIG-8-
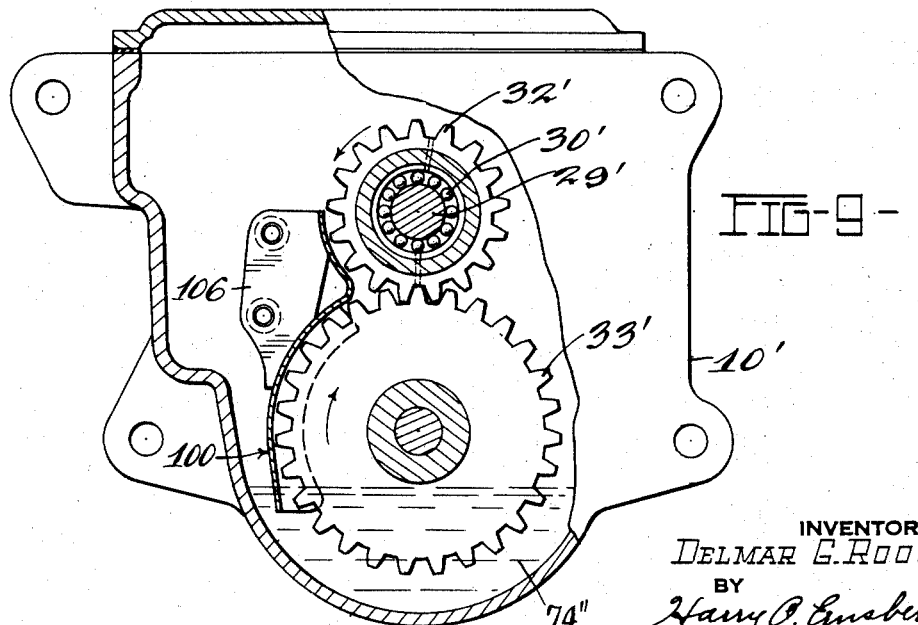
FIG-9-
INVENTOR:
DELMAR G. ROOS.
BY
Harry P. Ensberger
ATTORNEY July 14, 1953  D. G. ROOS  2,645,305
MEANS FOR LUBRICATING BEARINGS
Filed May 22, 1951  4 Sheets-Sheet 4
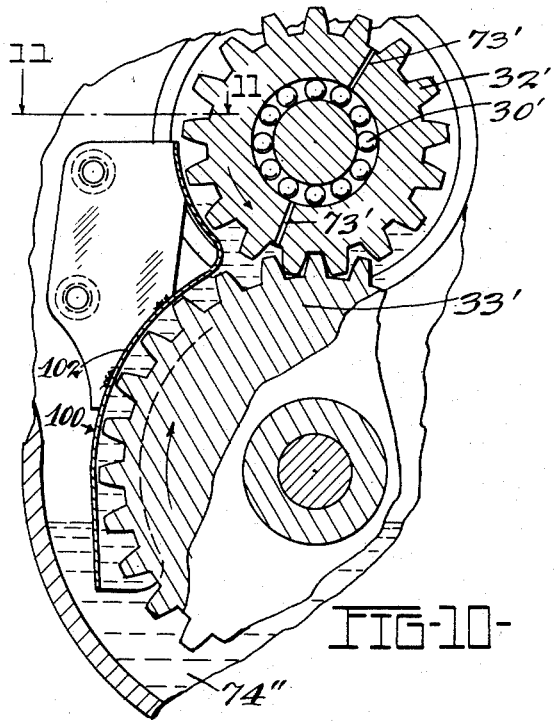
FIG-10-
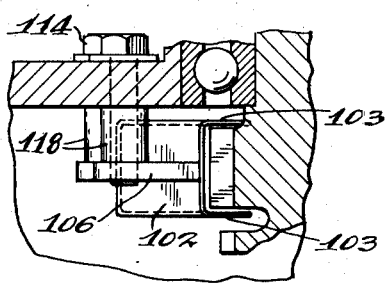
FIG-11-
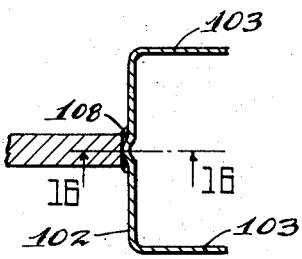
FIG-15-
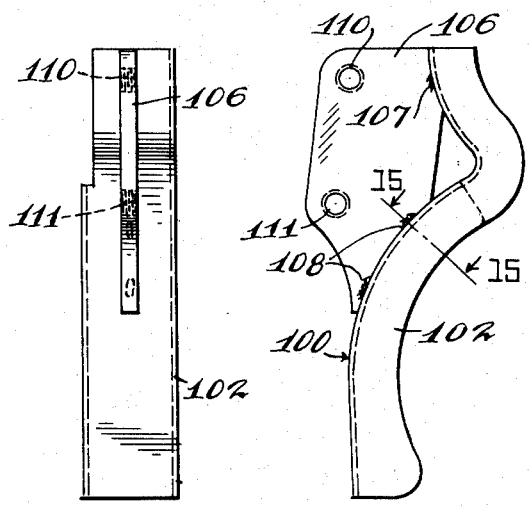
FIG-14-  FIG-12-
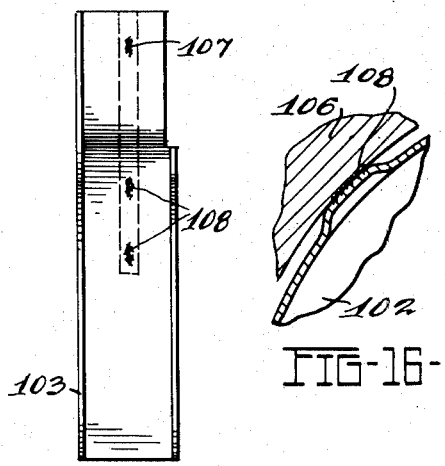
FIG-13-
FIG-16-
INVENTOR:
DELMAR G. ROOS.
BY
Harry O. Ernsberger
ATTORNEY Patented July 14, 1953

2,645,305

UNITED STATES PATENT OFFICE 2,645,305

MEANS FOR LUBRICATING BEARINGS

Delmar G. Roos, Toledo, Ohio, assignor, by mesne assignments, to Willys Motors, Inc., Toledo, Ohio, a corporation of Pennsylvania Application May 22, 1951, Serial No. 227,591

5 Claims. (Cl. 184—11)

This invention relates to means for lubricating bearings and more particularly to an arrangement for lubricating bearings forming a part of power transmission mechanism and is a continuation-in-part of my copending application Serial Number 542,663, filed June 29, 1944, and now issued into Patent No. 2,602,522.

The invention embraces the provision of means associated with gearing whereby lubricating oil is conveyed to bearings which would not otherwise receive adequate lubrication.

An object of the invention resides in the provision of a means associated with gearing whereby a lubricant conveying channel is formed cooperating with the gearing to direct lubricant into a bearing and without resorting to the inclusion of additional moving elements in the mechanism.

Further objects and advantages are within the scope of my invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which:

Figure 1 is an elevational view of power transmission gearing of a type typically employed in an automotive vehicle, certain parts being shown in section for purposes of illustration;

Figure 2 is a transverse sectional view taken substantially on the line 2—2 of Figure 1;

Figure 3 is a fragmentary detailed sectional view taken substantially on the line 3—3 of Figure 2;

Figure 4 is an elevational view of one of the elements forming part of the lubricant conveying arrangement of my invention;

Figure 5 is an isometric view of several parts of the lubricant collecting shroud illustrated in disassembled relationship;

Figure 6 is a fragmentary sectional view through a transmission mechanism illustrating a modified form of arrangement of my invention;

Figure 7 is a fragmentary sectional view through the transmission mechanism, the section being taken substantially on the line 7—7 of Figure 6;

Figure 8 is a view similar to Figure 1 illustrating a modified form of the invention, certain parts being shown in section for purposes of illustration;

Figure 9 is a vertical sectional view taken substantially on line 9—9 of Figure 8;

Figure 10 is an enlarged fragmentary detail view illustrating the cooperation of transmission gears and shroud in elevating lubricant;

Figure 11 is a horizontal detailed sectional view taken substantially on the line 11—11 of Figure 10;

Figure 12 is an elevational view of the oil collector shroud or enclosure per se;

Figure 13 is a front elevation of the structure shown in Figure 12;

Figure 14 is a rear elevational view of the structure shown in Figure 12;

Figure 15 is an enlarged detailed sectional view taken substantially on the line 15—15 of Figure 12, and Figure 16 is an enlarged fragmentary sectional view taken substantially on the line 16—16 of Figure 15.

While I have illustrated the arrangement of my invention as having particular utility in lubricating bearings supporting elements of power transmission mechanisms, it is to be understood that I contemplate the incorporation of my invention in any mechanism wherein the same may be utilized to enhance the lubrication of mechanical devices.

Referring to the drawings in detail, a form of my invention is illustrated in Figures 1 through 5 inclusive wherein reference character 10 designates a housing structure configurated to enclose power transmission gearing particularly adapted for transmitting power from an engine to the drive wheels of an automotive vehicle. Disposed within an opening in an end wall 11 of the transmission housing is an antifriction bearing 12, the outer race 13 of the bearing being secured in position by means of a snap ring 14, the inner race being mounted upon a shaft 15 and held in place thereon by means of a snap ring 16. The shaft 15 has a splined portion 18 adapted for connection to an engine or other source of power (not shown) the shaft having a portion 19 extending through a bracket 20, the latter being secured to the transmission housing 10. The bracket 20 is provided with a sleeve portion 21 surrounding the portion 19 of shaft 15 and is formed with lubricant sealing means (not shown) to prevent the escape of lubricant from the transmission housing along the shaft 15. The rear wall 23 of the transmission housing supports an antifriction or ball bearing 24 supporting a shaft 25 in axial alignment with shaft 15 and which is adapted for connection to a propeller shaft (not shown) for transmission of power to the drive wheels of a vehicle or other mechanism to be driven. A portion of the shaft 15 disposed within the transmission housing is provided with a central aperture or chamber 28, and the shaft 25 is formed with a reduced tenon 29 extending into the chamber 28, there being an antifriction bearing means 30 disposed in the chamber and supporting the tenon 29 of the shaft 25. In the embodiment illustrated an antifriction bearing means 30 is of the so-called "needle" type, it being particularly adaptable in providing a compact installation.

The shaft 15 is integrally formed with a toothed portion or gear 32 which is in enmeshment with a gear 33 formed on a countershaft 34, the countershaft being revolubly journaled upon a pin or stub shaft 35 which is carried in suitable openings formed in the transmission end walls 11 and 23. The countershaft 34 is also formed with gears 37, 38 and 39. Gear 37 is in constant mesh with a gear 40, the latter normally loosely journaled for rotation upon shaft 25. Another gear 41 slidable along the shaft 25 is suitably splined thereto (in a manner not shown) so that it is caused to rotate with the shaft 25 and is designated the "low speed" gear. When gear 41 is moved to the left from its position indicated in dotted lines in Figure 1 it is brought into enmeshment with countershaft gear 38 whereby power is transmitted from shaft 15 to shaft 25 through gears 32, 33, 38 and 41 at a reduced ratio.

Gear 40 is provided with a toothed clutch portion 44 which cooperates with a synchronizing device (not shown in detail) of conventional design so that when slidable clutch member 45 is moved to the right as viewed in Figure 1 by means of a yoke or shifting fork (not shown) which extends into groove 46, a positive drive connection is established through clutch 44 and clutch member 45 to establish a drive connection through gears 37 and 40 to shaft 25. This is conventionally known as a "second speed" gear. The inner extremity of shaft 15 is formed with a toothed clutch portion 48 so that upon sliding movement of the shiftable clutch 45 to the left as viewed in Figure 1, a direct drive connection is provided through shaft 15 to shaft 25. This establishes the "high speed" or direct drive connection. Reverse gear is obtained in a conventional manner by sliding the gear 41 to the right as viewed in Figure 1, bringing the same into enmeshment with a gear (not shown) which is in mesh with the gear 39.

One of the major objects of the instant invention is the provision of means for adequately lubricating the antifriction or needle bearing 30, which supports the tenon portion 29 of shaft 25. To this end, a shroud or enclosure 50 partially encloses and cooperates with gear 33 to provide a means for conveying lubricant or oil to the needle bearing. In the embodiment illustrated in Figures 1 through 5 inclusive, the shroud 50 is inclusive of an arcuate channel-shaped member 51 preferably formed of sheet metal, a wall 52 of the shroud being provided with an opening 53 through which extends the pin or stub shaft 35 supporting the gear 33. Welded as at 55 to the opposite wall 54 of the channel configuration is an extension element 56 having a semicylindrical portion 57 which partially embraces the countershaft 34 as particularly shown in Figure 2. The portion 57 is joined to the wall 54 by means of a portion 61 configurated to accommodate a fillet joining the gear 33 with the shaft 34. The extension 56 including the portion 57 is preferably fabricated as an independent element joined to the channel-shaped member 51 by welding in order to facilitate the manufacture of the arrangement.

Embracing the exterior surface of portion 57 is a U-shaped member or strap 58 welded to the portion 57, member 58 having laterally extending ear portions 59 provided with threaded openings 60. A second U-shaped member 62 similar in configuration to member 58 is formed with ear portions 63 having openings 64 which are adapted to register with openings 60 in member 58 and to receive screws 65 for holding the U-shaped members together. Members 58 and 62, together with extension 57, embrace the shaft 34, but extension 57 and member 62 are slightly spaced from the shaft 34 and are normally out of contact therewith. An L-shaped bracket 67 has one leg welded as at 68 to the bight portion of channel member 51, while the other leg of the bracket is provided with an opening 70 to accommodate a threaded securing member or cap screw 71, the threaded portion of which extends into a threaded opening in the end wall 11 of the transmission housing 10. While the screw 71 normally positions the enclosure 50 with respect to gear 33, the enclosure is prevented from being disarranged to a major extent as any movement thereof would be limited by engagement of extension 57 or strap 62 with the exterior surface of shaft 34. Thus by means of the securing member 71 and the configuration formed by extension 57 and U-shaped member 62 the shroud or enclosure 50 is maintained in proper position as shown in Figures 1 and 2 and prevents any physical contact of the channel shaped member 51 with the periphery of gear 33. Furthermore, through the employment of separable members 58 and 62, the arrangement of my invention may be incorporated in transmission mechanisms without dismantling or disturbing the gearing by sliding the stub shaft 35 in a righthand direction as viewed in Figure 1 to admit the wall 52 and then returning the shaft 34 through the opening 53 to the position shown in Figure 1.

The wall portion of shaft 15 defining the chamber 28 for the needle bearing 30 is provided with passages or openings 73 radially arranged and disposed between teeth of the gear 32, there being two illustrated, although any number of openings or passages 73 may be utilized for the admission of lubricant into the chamber 28. The base of the transmission housing 10 is adapted to contain a quantity of lubricant 74 as illustrated in Figure 1 so that gear 33 is partially immersed at all times in the lubricant. The lower extremity of the channel-shaped lubricant collector or enclosure 50 is formed with a scoop-like ramp 75 projecting into the lubricant in the housing 10. Thus during rotation of gear 33 in a clockwise direction as viewed in Figure 2, the teeth of gear 33 in cooperation with the enclosure 50 confines and conveys lubricant along the inside walls of the enclosure 50 to the point where the teeth of gears 32 and 33 are in enmeshment. At the point of enmeshment, lubricant may flow through the openings or passages 73 into chamber 28 and provide oil or lubrication for the needles of the bearing 30. By this means adequate lubrication is provided for the bearing 30 without the use of any additional moving parts in the transmission or gearing arrangement.

In the modification of my invention illustrated in Figures 6 and 7, the shroud or enclosure is partially formed as an integral component of the transmission housing in cooperation with a sheet metal plate. In this form of the invention the housing 10' is formed with an integral abutment 80 having arcuate surface 81 surrounding but slightly spaced from the exterior periphery of the teeth of gear 33'. A sheet metal plate 82 is fixedly secured to the abutment 80 formed in housing 10' by means of a threaded member or cap screw 83 extending into a threaded opening in the housing wall. The housing is preferably formed with a lug or projection 84 forming with abutment 80 a kerf 85 to accommodate plate 82 and assist in maintaining the plate in proper relationship with respect to gear 33'. The plate 82 is formed with a laterally extending lip 86 which, in effect, forms a continuation of the arcuate surface 81 and completes the lubricant conveying channel configuration whereby the teeth of gear 33' carry lubricant to the point of interenmeshment of gear 32' with gear 33', the lubricant entering the passages 73' in gear 32' to lubricate the needle bearing 30'. The plate 82 is formed with a semicylindrical extension 87 embracing a portion of but spaced from shaft 34' to aid in confining lubricant within the channel formed by abutment 80 and plate 82. The extension 87 and the uniplanar portion of plate 82 are joined by means of a semiannular portion 88 to accommodate the fillet at the juncture of shaft 34' with gear 33'.

The functioning of this form of invention is similar to that of the form shown in Figures 1 through 5 inclusive. Gear 33' being immersed in lubricant 74', and gear 33' rotating in a clockwise direction as viewed in Figure 6 in cooperation with plate 82, confines and conveys lubricant to the point of enmeshment of gears 32' and 33' so that the lubricant may pass through openings 73' to lubricate the needle bearing.

Figures 8 through 16 inclusive illustrate a modified form of the invention. With reference initially to Figures 8 and 9, the transmission housing 10' encloses transmission gearing of the same character as disclosed in Figures 1 and 2. The gear portion 32' formed on the extremity of the shaft 15' extending into the housing 10' is formed with a hollow chamber 28' in which are disposed needle bearings 30' on which the tenon 29' of shaft 25' is journally supported. The gear portion 32' drives the countershaft gear 33', the latter forming a part of a gear cluster supported upon a shaft 35'.

Disposed adjacent the gears 32' and 33' is a shroud or collector 100 which is inclusive of a substantially U-shaped member 102, the wall portions 103 of the member 102 straddling the teeth of the gears 32' and 33' in the manner illustrated in Figure 11. The length or extent to which the member 102 embraces the gears is illustrated in Figure 10. It is imperative to the successful operation of the arrangement in elevating lubricant for lubricating the needle bearings 30' that the lower portion of member 102 be immersed in lubricant 74'' to provide a wall or abutment cooperable with the teeth of the gears 32' and 33' in elevating lubricant.

Secured to the sheet metal member 102 is a plate or element 106 having its forward edge portion in contact with the bight portion of the member 102 in the manner illustrated in Figures 12 through 14. The contacting edge portions of the member 106 with the shroud or enclosure 102 are welded at zones 107 and 108 to the member 102. The member 106 may be secured by other means to the member 102 if desired. The plate or element 106 is provided with threaded openings 110 and 111 through which extend securing bolts 114 and 115 in the manner shown in Figure 8. The bolts 114 and 115 project through a wall of the transmission housing 10', and disposed between the inner wall surface of the housing and the plate 106 are spacing collars or positioning means 118 which, in cooperation with the bolts 114 and 115, serve to rigidly maintain the member 102 in proper embracing relation with respect to the gears 32' and 33'.

It will be apparent from examination of Figures 8, 9 and 10 that, through the rotation of the gears 32' and 33' in cooperation with the channel-shaped configuration of member 102, lubricant 74'' contained in the reservoir or sump portion of the transmission housing 10' will be continuously elevated by the teeth of the rotating gears whereby the lubricant is caused to flow through the openings or passages 73' formed in the gear 32' to provide an adequate and continuous supply of oil or lubricant to the needle bearing assembly 30'. In this form of the invention, access to the securing bolts 114 and 115 from the exterior of the transmission housing 10' facilitates ease of assembly.

It is apparent that, within the scope of the invention, modifications and different arrangements may be made other than is herein disclosed, and the present disclosure is illustrative merely, the invention comprehending all variations thereof.

What I claim is:

1. In combination, a housing: a pair of gears journalled for rotation in said housing; one of said gears being partially immersed in lubricant contained in said housing; the other of said gears having an axially disposed chamber formed therein; a radially arranged lubricant conveying passage formed in a wall of the chamber; a shaft; a bearing in said chamber forming a support for the shaft; means for elevating lubricant from the supply in said housing to said chamber including a relatively stationary shroud partially embracing both said gears; a flange secured to said shroud, and securing means cooperating with said flange and said housing wall for supporting the shroud.

2. In combination, a transmission housing; a pair of intermeshing gears journalled for rotation in said housing; one of said gears adapted to be partially immersed in lubricant contained in said housing; the other of said gears having an axially disposed chamber formed therein; a radially arranged lubricant conveying passage formed in a wall of the chamber; a shaft; a bearing in said chamber forming a support for the shaft; means for elevating lubricant from the supply in said housing to said chamber including a relatively stationary shroud partially surrounding both said gears; a plate secured to said shroud and having a pair of spaced openings formed therein, and securing means extending through the housing wall and into the openings in the plate for supporting the shroud.

3. In combination, a housing; a pair of gears journalled for rotation in said housing; one of said gears adapted to be partially immersed in lubricant contained in said housing; the other of said gears having an axially disposed chamber formed therein; a radially arranged lubricant conveying passage formed in a wall of the chamber; means for elevating lubricant from the supply in the housing to said chamber including a channel-shaped element configured to partially surround both said gears; a flange member secured to the bight portion of the channel-shaped element; means including a collar disposed adjacent an inner wall of the housing for spacing the flange member from the wall, and means extending through openings in the wall of the housing and the flange and through the collar for supporting the channel-shaped member.

4. In combination, a transmission housing; a pair of interenmeshing gears journalled for rotation in said housing; one of said gears adapted to be partially immersed in lubricant contained in said housing; the other of said gears having an axially disposed chamber formed therein; a radially arranged lubricant conveying passage formed in a wall of the chamber; a shaft; a bearing in said chamber forming a support for the shaft; means for elevating lubricant from the supply in the housing to said chamber including a channel-shaped element configurated to partially surround both said gears; a flange member welded to the bight portion of the channel-shaped element, said flange member being formed with spaced threaded openings, and bolts extending through openings in the wall of the housing and into the threaded openings in the flange for supporting the channel-shaped member.

5. In combination, a housing; a pair of gears journalled for rotation in said housing; one of said gears adapted to be partially immersed in lubricant contained in said housing; the other of said gears having an axially disposed chamber formed therein; a pair of radially arranged lubricant conveying passages formed in a wall of the chamber; a shaft; a bearing in said chamber forming a support for the shaft; means for elevating lubricant from the supply in the housing to said chamber including a channel-shaped element formed of sheet metal and configurated to partially surround both said gears; a plate welded to the bight portion of the channel-shaped element, said plate being formed with spaced threaded openings; means including spacing collars interposed between said plate and a wall of the housing for positioning the channel-shaped member astraddle the gears, and means including bolts projecting through a wall of the housing through the collars and into the threaded openings in said plate for supporting said channel-shaped member.

DELMAR G. ROOS.

References Cited in the file of this patent

UNITED STATES PATENTS

| Number | Name | Date |
|---|---|---|
| 1,856,189 | Johnson | May 3, 1932 |
| 2,389,137 | Buckendale | Nov. 20, 1945 |